United States Patent [19]

Sibley et al.

[11] Patent Number: 4,782,848
[45] Date of Patent: Nov. 8, 1988

[54] SHOCK ACTUATED DEVICE

[75] Inventors: Richard D. Sibley, Anaheim; William F. Keller, Covina, both of Calif.

[73] Assignee: Koso International, Inc., Santa Fe Springs, Calif.

[21] Appl. No.: 145,926

[22] Filed: Jan. 20, 1988

[51] Int. Cl.⁴ .................... G05G 17/00; F16K 17/36
[52] U.S. Cl. ............................................. 137/38; 74/2;
 137/39; 137/627.5; 251/25; 403/326; 403/379
[58] Field of Search .............. 74/2; 137/38, 39, 627.5;
 251/25; 403/326, 378, 379

[56] References Cited

U.S. PATENT DOCUMENTS

| | | | |
|---|---|---|---|
| 2,159,785 | 5/1939 | Down | 137/39 X |
| 2,637,331 | 5/1953 | Sullivan | 137/39 |
| 2,766,473 | 10/1956 | Thalkara | 403/326 X |
| 3,471,186 | 10/1969 | Luebbert et al. | 403/326 X |
| 4,185,507 | 1/1980 | Domyan | 74/2 |
| 4,475,565 | 10/1984 | Keller et al. | 137/39 |
| 4,503,717 | 3/1985 | Keller et al. | 74/2 |
| 4,505,058 | 3/1985 | Peterson | 403/326 X |
| 4,513,629 | 4/1985 | Keller et al. | 74/2 |
| 4,603,591 | 8/1986 | Sibley et al. | 74/2 |

Primary Examiner—Allan D. Herrmann
Attorney, Agent, or Firm—William P. Green

[57] ABSTRACT

An automatic safety mechanism including an actuator for operating a valve or other controlled unit and which is operable by compressed air or other pressurized fluid, a valve structure for controlling the delivery of pressurized fluid from a source to the actuator, a shock responsive mechanism operable by shock forces to actuate the valve structure to a condition operating the actuator by fluid from the source, and a device operable automatically in response to a decrease in the pressure of fluid from the source to admit pressure fluid to the actuator for operating it. An assembly for resetting the shock responsive mechanism to a cocked position includes a shaft operable by rotation about an axis to set the mechanism, a sleeve disposed about the shaft, and a retaining element movable to a position in the path of axial removal of the sleeve from the device to retain both the sleeve and shaft against withdrawal. The device preferably includes a swinging arm which is spring urged in a predetermined direction and is released for movement in that direction automatically in response to shock forces, and which acts through two cams to operate two valves for controlling the delivery of pressure fluid to and from the fluid actuated controlled unit.

34 Claims, 4 Drawing Sheets

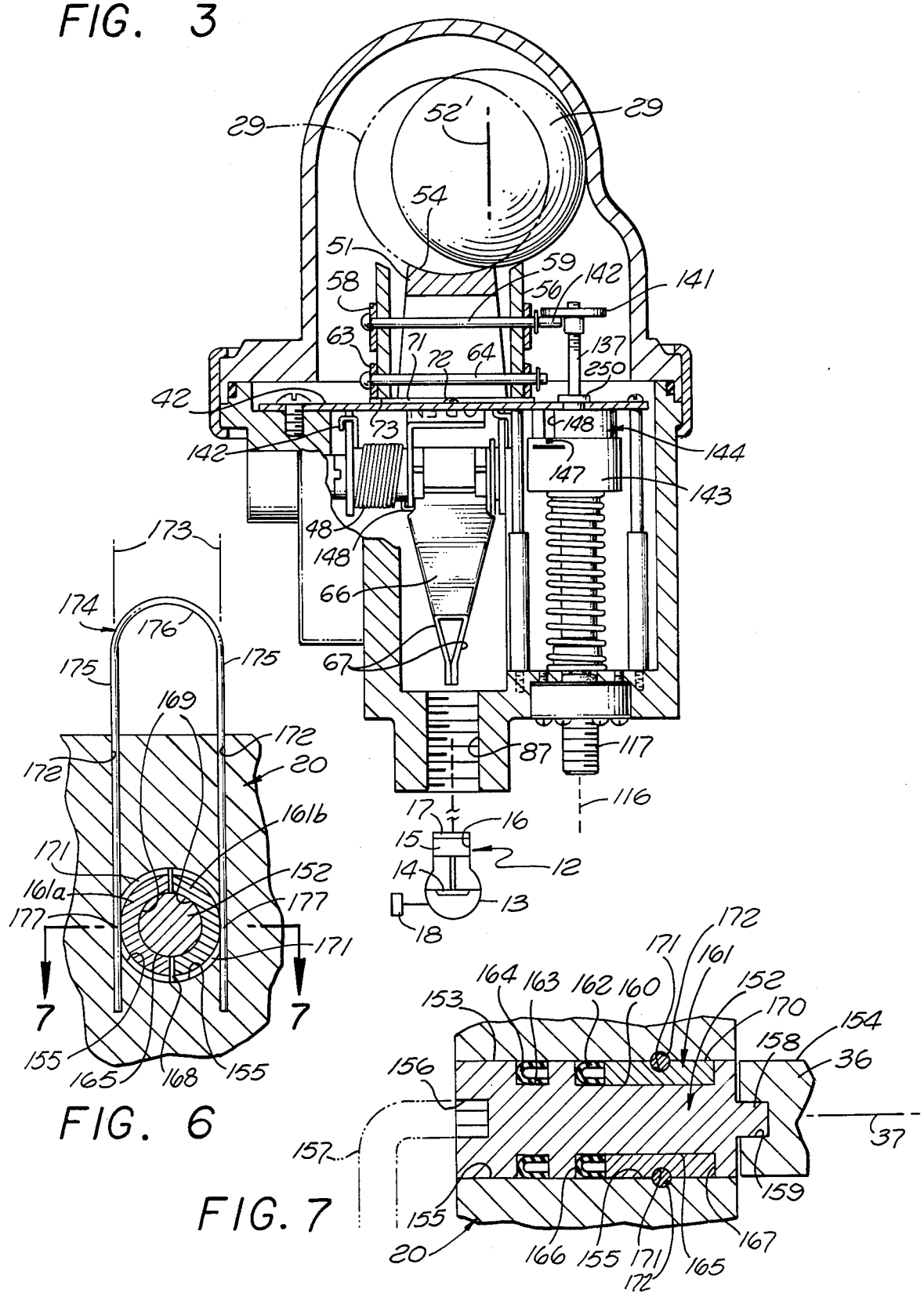

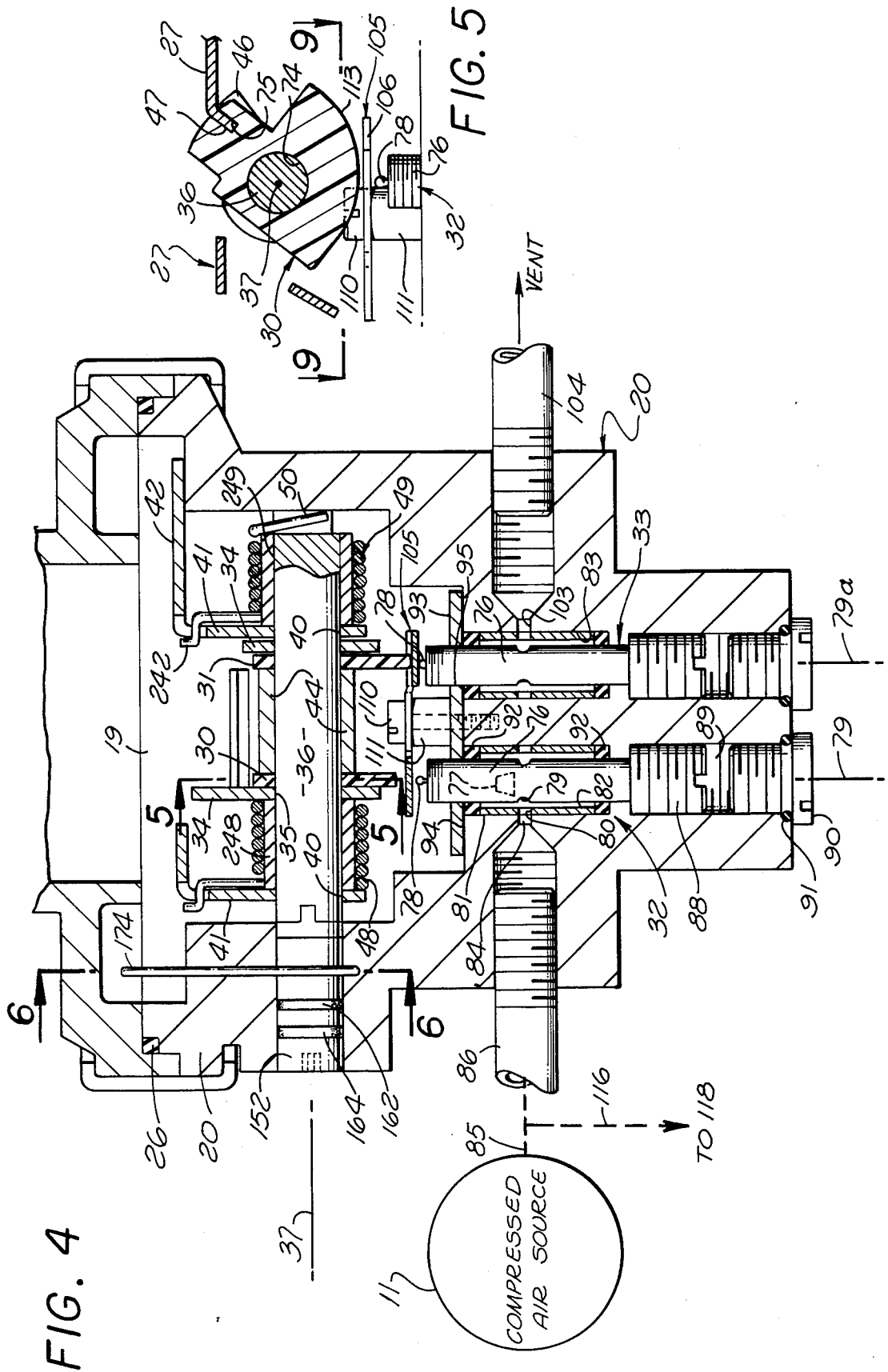

SHOCK ACTUATED DEVICE

BACKGROUND OF THE INVENTION

This invention relates to improved devices for actuating a valve or other controlled unit automatically in response to forces developed by an earthquake or other shock forces of predetermined magnitude.

A device embodying the invention may be of the general type disclosed in U.S. Pat. No. 4,185,507 issued Jan. 29, 1980 to Domyan, including a weight which is displaceable by shock forces relative to a support structure and which acts when displaced to operate a mechanism serving to close a valve or actuate another controlled unit. Other similar shock responsive devices are shown in U.S. Pat. Nos. 4,475,565, 4,503,717, 4,513,629 and 4,603,591. In each of these, the shock actuated mechanism may include a tubular element disposed about a pedestal on which the weight is located, with the tubular element being actuable downwardly by the weight when the weight is displaced laterally from its normal position on the pedestal. In some of these prior arrangements, the shock responsive mechanism acts directly and mechanically to close off a gas valve or the like when subjected to shock forces. In U.S. Pat. No. 4,513,629, the mechanism functions to open a pilot valve, which admits compressed air or other pressure fluid to an actuator, which is then operated by the force of the pressure fluid to close a main valve or actuate another controlled unit.

SUMMARY OF THE INVENTION

Certain features of the present invention relate to improvements in shock responsive units of the type utilizing air or other pressure fluid as an actuating force, with the improvements being directed toward increasing the reliability and operational effectiveness of the devices, and assuring that they will operate as intended and without fail when an earthquake or the like occurs. One important feature of the invention involves the provision of means for sensing a reduction in the pressure of the acutating fluid, and responding to an excessive drop in that pressure to indicate the abnormal condition and alert a user to correct the problem. When the pressure drops, the apparatus preferably responds by actuating the controlled valve or other controlled unit to the same condition which it would assume in the event of an earthquake. For example, if the purpose of the device is to close a gas valve when an earthquake occurs, the device may function to close the same valve when the pressure of the actuating fluid falls excessively. In order to return the apparatus to its normal condition, an operator is then required to correct the inadequate pressure condition, and take whatever action is necessary to assure that the supplied pressure is at a proper value.

Other features of the invention relate to the provision of two valves which control the delivery of compressed air or other actuating fluid to and from a controlled unit, and which are operated by the shock responsive mechanism through two cams functioning to open one valve and close the other when the device is subjected to shock forces.

An additional feature of the invention has to do with an arrangement for minimizing frictional resistance to rotation of a resetting shaft by which the device is adapted to be set to a predetermined cocked or active condition. For this purpose, a sleeve is disposed about the resetting shaft, and is connected to it for movement with the shaft into and out of a retaining passage in the body of the device, with the sleeve being retained against axial movement by a holding element, and with the shaft being rotatable relative to the sleeve in a relation enabling the retaining element to hold the entire assembly in place while permitting rotation of the shaft relative to the sleeve. The sleeve is preferably formed of two semi-circular complementary sections.

DESCRIPTION OF THE DRAWINGS

The above and other features and objects of the invention will be better understood from the following detailed description of the typical embodiment illustrated in the accompanying drawings, in which:

FIG. 3 is a vertical section taken primarily on line 3—3 of FIG. 1;

FIG. 4 is a fragmentary vertical section taken on line 4—4 of FIG. 1;

FIGS. 5 and 6 are enlarged fragmentary vertical sections taken on lines 5—5 and 6—6 respectively of FIG. 4;

FIG. 7 is a fragmentary horizontal section taken on line 7—7 of FIG. 6;

DESCRIPTION OF THE PREFERRED EMBODIMENT

Figure 1:
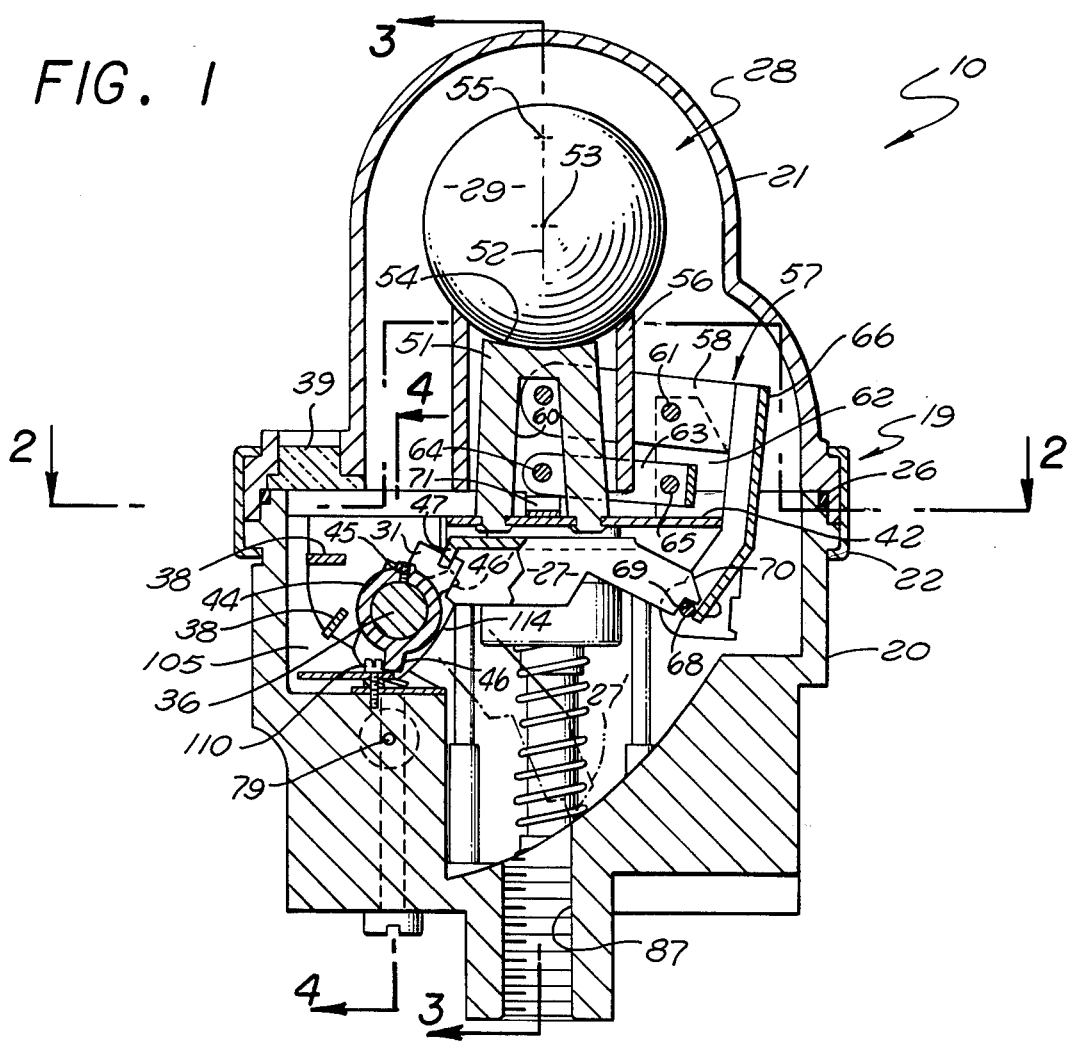
FIG. 1 is a central vertical section through a shock responsive unit constructed in accordance with the invention.

The device 10 illustrated in the drawings is a shock responsive actuator which functions automatically when subjected to the forces developed by an earthquake or other shock forces to admit compressed air or another pressurized fluid from a source 11 (FIG. 4) to a fluid pressure actuated device 12 (FIG. 3) for operating a controlled unit 13 typically taking the form of a valve having a valve element 14 operable upon downward movement in FIG. 3 to close off a supply of natural gas to a home, commercial building, or the like. The unit 12 may include a piston represented at 15 movable within a cylinder 16 and actuable downwardly by admission of compressed air from source 11 to the upper cylinder chamber 17 above the piston. Until the unit 10 has been actuated by earthquake or other shock forces, the device is in the cocked position represented in full lines in FIG. 1, and the cylinder chamber 17 above piston 15 of FIG. 3 is vented to atmosphere through the device 10 to enable an operator to manually actuate valve 14 by an operating handle represented diagrammatically at 18.

Figure 2:
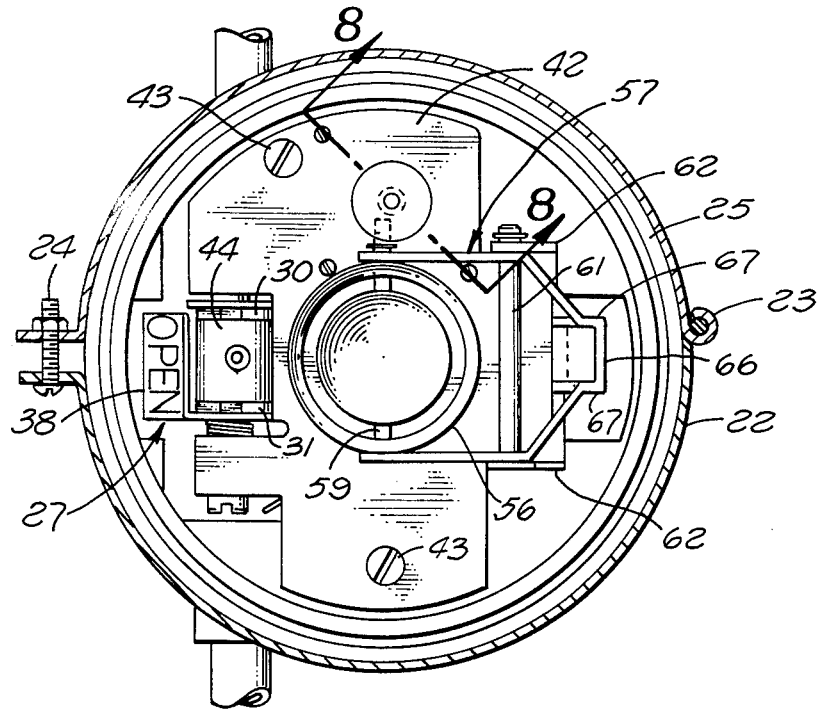
FIG. 2 is a view taken on line 2—2 of FIG. 1.

The device 10 includes a hollow body 19 having a lower hollow body section 20 and an upper cover 21 secured together in sealed relation by an essentially annular clamp 22 which may be formed of two sections as illustrated in FIG. 2 hinged together at 23 and tightenable relative to one another by a fastener 24. Clamp 22 is received about and secures together two externally circular flange portions 25 of the two body sections 20 and 21, with a fluid tight seal being formed between the two body sections by a rubber O-ring 26 or other seal element.

In the normal cocked position of the device 10, an arm 27 located within the lower body section 20 is retained in the full line position of FIG. 1 by a shock actuated mechanism 28 located in the upper portion of the body. When the mechanism 28 is subjected to a shock of predetermined magnitude, displacement of a weight 29 of that mechanism causes the mechanism to automatically release arm 27 for spring induced swinging movement to the broken line position of FIG. 1, with resultant actuation by two cams 30 and 31 of two valve units 32 and 33 which cause actuation of unit 12 and the valve 13 of FIG. 3.

Arm 27 may be stamped of sheet metal and have two spaced vertical wall portions 34 (FIG. 4) containing aligned openings 35 through which a mounting shaft 36 extends to mount arm 27 for pivotal movement about a horizontal axis 37 relative to the shaft and relative to the body of the device. Two indicator tabs 38 (FIG. 1) are carried by and project from one of the portions 34 of arm 27 and have "open" and "closed" markings formed thereon and visible from the outside of the housing through a sealed transparent window 39, to indicate the open or closed condition of the controlled valve 13.

Shaft 36 may be journalled for rotation about axis 37 by reception within aligned bearing openings 40 in two spaced vertical members 41 which may be formed as downwardly turned parallel portions of a horizontal plate 42 attached rigidly to the lower body section 20 by screws 43 extending downwardly through openings in plate 42 and connecting threadedly into section 20. A tubular part 44 (FIGS. 1 and 2) carried about and fitting closely on the external cylindrical surface of shaft 36 is fixed rigidly to the shaft by a set screw 45, and has a lug 46 which is engageable (see broken line position 46' in FIG. 1) with a shoulder 47 formed as a portion of arm 27 in a relation forming a lost motion connection between shaft 36 and arm 27 by which the shaft can swing the arm and carried valve in a counterclockwise direction as viewed in FIG. 1 and from the broken line position 27' of the arm in that figure to the cocked full line position.

Arm 27 is yieldingly urged pivotally about axis 37 in a clockwise direction as viewed in FIG. 1, and to the broken line position 27' of that figure by a coil spring 48 (FIG. 4) disposed about the shaft and having one of its ends engaged with the arm at 148 (FIG. 3), and its other end engaged with one of the portions 41 of plate 42 at 142. A second coil spring 49 about the shaft has one of its ends engaged within a transverse slot 50 formed in an end of shaft 36 (FIG. 4), and has its opposite end engaged with the second of the two portions 41 of plate 42 at 242, in a relation urging shaft 36 and the carried tubular part 44 in a clockwise direction as viewed in FIG. 1 and to the FIG. 1 full line position of part 44 and its stop lug 46. Two tubular sleeves 248 and 249 may be disposed rotatably about shaft 36 at locations within the two springs 48 and 49 respectively.

The weight or mass 29 of the shock actuated mechanism 28 in the upper portion of the body of the device preferably takes the form of a solid ball or sphere of metal. When the device is in its FIG. 1 cocked or unactuated condition, ball 29 is supported on a pedestal 51 extending upwardly along a vertical axis 52, with the center 53 of the ball located on that axis. The pedestal may be externally circular about axis 52 and taper slightly as shown, and have an upper spherically curved surface 54 defining an upwardly facing shallow recess of a depth and contour to normally retain ball 29 in its centered position on the pedestal. Spherical surface 54 of the pedestal has its center 55 located on the vertical axis 53 and preferably above the center 53 of the ball. The ball is displaceable from its normal centered position on the pedestal, as to the full line position of FIG. 3, by shock induced movement of the pedestal relative to the ball, during which movement the inertia of the ball resists movement thereof with the pedestal. The lower end of the pedestal may be attached rigidly to the previously mentioned horizontal base plate 42 secured to lower body section 20.

A vertical tube 56 which is centered about axis 52 and disposed about and spaced from pedestal 51 is movable vertically relative to the pedestal between the FIG. 1 and FIG. 3 positions. The tube may be mounted for this movement by a parallelogram mechanism 57, including two similar parallel upper links 58 each pivoted at one end to the tube by a horizontal pin 59 extending through a vertical slot 60 in pedestal 51, and each pivoted by a second parallel horizontal pin 61 to a pair of vertical bracket arms 62 projecting upwardly from plate 42. Mechanism 28 also includes two similar parallel lower links 63 each pivoted by a first pin 64 to the tube and by a second pin 65 to the bracket arms 62. The two upper links 58 may be stamped from a single piece of sheet metal forming a cross piece 66 at the right ends of the links as seen in FIG. 1, and forming two spaced parallel vertical side walls 67 (FIG. 2) projecting downwardly and carrying a cross pin 68 (FIG. 1) which acts to engage arm 27 and latch it in the full line position of FIG. 1. For engagement with pin 68, the swinging arm 27 contains a notch 69 within which pin 68 is received in the FIG. 1 full line position, to retain the arm against clockwise swinging movement. Upon upward swinging movement of arm 27 from the broken line position of FIG. 1 to the full line position of that figure, a cam surface 70 of the arm engages and deflects pin 68 in a manner allowing the arm to pass the pin and permit movement of the pin into a latched position within notch 69. Subsequent downward movement of tube 56 causes rightward swinging movement of cross pin 68, to release arm 27 for clockwise swinging movement to its broken line position of FIG. 1. The tube is yieldingly urged upwardly by an appropriate spring, typically a leaf spring 71 (FIG. 3) welded at a central location 72 to plate 42 and having end portions 73 urged upwardly and applying yielding upward force to tube 56 at diametrically opposite locations. When weight 29 is moved laterally in any horizontal direction relative to pedestal 51, as to the full line position of FIG. 3, the weight engages tube 56 and displaces it downwardly to the position of FIG. 3 to move pin 68 out of notch 69 in arm 27 and allow swinging movement of arm 27 by spring 48 from the full line position of FIG. 1 to the broken line position. Such lateral displacement of the weight is limited by engagement of the weight with the upper dome shaped cover or top housing section 21. When the ball is displaced laterally in any direction from axis 52 to the maximum extent permitted by dome cover 21, such as for example to the full line position of FIG. 3, the point of contact of tube 56 with the underside of the ball is laterally outwardly beyond the vertical central axis of the ball, in a direction outwardly away from axis 52 (that is, to the right of axis 52' extending vertically through the center of the ball in FIG. 3), so that upon cessation of the shock forces, the upward force applied to the ball by tube 56 will be at a location causing the ball to be cammed inwardly to its original centered position on the pedestal, thus automatically resetting the ball relative to the pedestal.

The two cams 30 and 31 are disposed about shaft 36 at opposite axial sides of tubular part 44, and are connected essentially rigidly to arm 27 for rotation therewith about axis 37. For this purpose, cams 30 and 31 contain openings 74 within which shaft 36 is a close fit, and contain slots or recesses 75 extending generally radially with respect to axis 37 and within which the shoulder or edge portion 47 formed on arm 27 is received. This interfitting relationship between shoulder 47 and slots 75 keys the cams very positively in fixed rotary positions relative to arm 27, to effect rotary movement of the cams in correspondence with swinging movement of arm 27.

The two valve units 32 and 33 may be identical valve assemblies, preferably of the type conventionally used for filling air into and retaining it within inflatable elements such as automobile tires. More particularly, each of the valve units 32 and 33 includes a tubular body 76 containing a valve element diagrammatically represented at 77 actuable by a stem 78 movable upwardly and downwardly along an axis 79 or 79' of the tubular body. Valve element 77 and stem 78 are urged upwardly to closed positions by springs within their bodies 76, and are actuable downwardly by the corresponding cam 30 or 31. At a location beneath the valve element, the side wall of each of the tubular bodies 76 contains an opening 79 communicating with an opening 80 in a tube 81 surrounding the valve body. The valve units 32 and 33 and their surrounding tubes 81 are received within two vertical cylindrical passages 82 and 83 extending along vertical axes 79 and 79a and formed within the material of lower body section 20.

An opening or passage 84 formed in the material of the body at a side of valve unit 32 conducts air received from pressure source 11 through a line 85 and inlet fitting 86 on the body into the interior of passage 82 and through openings 80 and 79 into valve unit 32. When that valve unit is opened by cam 30, the compressed air can flow upwardly from the upper end of valve unit 32 into the interior of the body 19 of the device. That air can then flow downwardly from the interior of the body through an outlet 87 (FIG. 3) to piston and cylinder mechanism 12 to actuate valve 13. The valve units 32 and 33 are held in position within passages 82 and 83 by engagement of lower externally threaded end portions 88 on the tubular outer bodies 76 of valve units 32 and 33 with internal threads 89 formed in the lower portions of passages 82 and 83. The bottom of each of those passages 82 and 83 is closed by a plug 90 screwed into threads 89 and having a seal ring 91 for forming a fluid tight seal at the lower end of the passage.

Annular seal rings 92 may be provided between valve unit 32 and the wall of passage 82 above and beneath the tube 81 which is about unit 32, to confine the flow of compressed air axially between these two rings. Similar seal rings 92 may be provided between the second valve unit 33 and the wall of passage 83 at locations above and beneath the tube 81 in that passage. The two tubes 81 and their seal rings 92 are retained within passages 82 and 83 by a plate 93 resting on an upwardly facing horizontal surface 94 formed in body section 20, with that plate containing two openings 95 through which the upper ends of the tubular bodies of valve units 32 and 33 project upwardly.

The actuating stem 78 of valve unit 33 is actuable downwardly by cam 31. Openings in the side walls of the body of valve unit 33 and in the surrounding tube 81 communicate through a passage 103 in part 20 with an outlet fitting 104 leading to the atmosphere. Thus, when valve unit 33 is open, air can vent freely from the interior of body 19 and from the communicating cylinder chamber 17 in actuator 12, to avoid resistance to manual actuation of valve 13 by handle 18.

Figure 9:
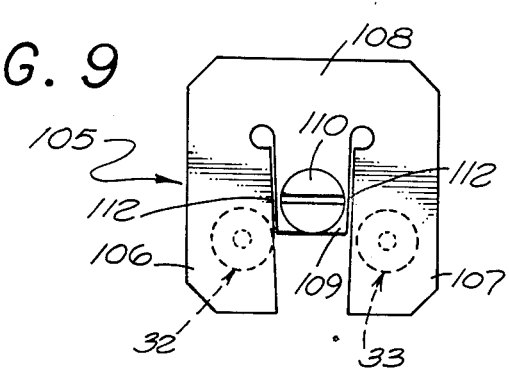
FIG. 9 is a fragmentary horizontal section taken on line 9—9 of FIG. 5.

Downward forces are transmitted from cams 30 and 31 to the stems 78 of valve units 32 and 33 through a leaf spring 105 having the horizontal outline configuration illustrated in FIG. 9. More specifically, this leaf spring may be formed of any appropriate resilient spring material such as a suitable brass, and may be generally U-shaped in configuration, having two arms 106 and 107 connected by a cross piece 108. A shorter arm 109 may be secured rigidly to the lower body section 20 by a screw 110 extending downwardly through an opening in central portion 109 of part 105 and through a vertical spacer tube 111 and threadedly connecting at its lower end into the material of lower body section 20. Arms 106 and 107 are separated from the central portion 109 by slits 112, and as seen in FIG. 4 each of these arms 106 and 107 is received vertically between the corresponding cam surface of one of the cams 30 or 31 and the associated stem 78 of the corresponding valve unit 32 or 33.

The peripheral cam surface 113 of cam 30 is formed to have its radius with respect to axis 37 progressively increase in a counterclockwise direction as viewed in FIG. 5, so that as arm 27 and cam 30 turn in a clockwise direction as viewed in that figure surface 113 of cam 30 progressively actuates valve stem 78 downwardly and opens valve 32 to admit pressure fluid to the interior of the body of the device and thus to the fluid actuated unit 12. The cam surface 114 of the second cam 31 is configured reversely, to progressively decrease in radius with respect to axis 37 in a counterclockwise direction, so that as the arm 27 and the cams turn in a clockwise direction as viewed in FIGS. 1 and 5 cam 31 progressively closes valve 33 to close off the venting communication between the interior of body 19 and the atmosphere. Thus, when arm 27 is in the full line position of FIG. 1, valve 33 is open to vent the interior of body 19 to the atmosphere and allow free manual actuation of the controlled valve 13, while valve 32 is closed to prevent flow of compressed air from source 11 into the body 19 of the device. In the actuated position of arm 27 represented in broken lines in FIG. 1, valve 32 is open to admit air to the interior of body 19 and to unit 12 to close valve 13, and valve 33 is closed to prevent loss of the actuating pressure to the atmosphere. The resilience of leaf spring 105 may be such as to urge arms 106 and 107 normally to upper positions in which valves 32 and 33 are closed, while permitting downward actuation of those arms and the valve stems by the cams.

With regard now to FIG. 8, the device 115 illustrated in that figure is provided within the interior of the hollow body 19 for automatically actuating mechanism 28, and releasing arm 27 for movement to its broken line position of FIG. 1, when the pressure of the compressed air supplied by source 11 falls below a predetermined critical value. At that value, the pressure is low enough that source 11 should be recharged, but is still high enough to effectively power actuator 12 for closing valve 13. The device 115 senses that pressure from source 11 through a line 116 connected to an inlet fitting 117 leading to a chamber 118 formed within a typically cylindrical part 119 secured by a series of circularly spaced screws 120 to the underside of a horizontal mounting plate 121. This plate 121 may in turn be secured rigidly to the previously mentioned upper plate 42 by a number of vertically extending connector posts 122. The lower ends of posts 122 may be attached to plate 121 by providing those ends with reduced diameter threaded portions 123 threadedly connected into openings in plate 121. The upper ends of the posts may be connected to plate 42 by screws 124 extending downwardly through that plate and connected threadedly into the upper ends of the posts.

The pressure in chamber 118 is applied to the underside of a flexible circular diaphragm 125, which may be formed of rubber or other resiliently flexible material, and which has a circular peripheral edge clamped tightly between a horizontal upper surface of part 119 and a horizontal undersurface of plate 121 to form a fluid tight seal about the periphery of the diaphragm confining the pressurized fluid to its underside. At its upper side, plate 121 has an upwardly projecting tubular portion 126 containing a helically extending groove 127 in its outer surface to which the lower end of a coil spring 128 is rigidly attached. The opening 129 in tubular portion 126 of plate 121 is cylindrical and extends downwardly through that plate to the upper surface of diaphragm 125.

An externally cylindrical spindle or shaft 130 extends along a vertical axis 131 and is movable upwardly and downwardly along that axis, and has its lower end projecting downwardly through the opening 129 in plate 121 into engagement with diaphram 125, to be actuated upwardly by that diaphragm upon application of fluid pressure to the underside of the diaphragm. Downward movement of shaft 130 is limited by engagement of an annular downwardly facing shoulder 132 on the shaft with the upper horizontal end of tubular portion 126 of plate 125. Beneath shoulder 132, shaft 130 has an outer cylindrical surface 133 which is a close fit within the cylindrical opening 129 in plate 121, to guide the shaft for upward and downward movement. Above the level of shoulder 132, shaft 130 has a slightly larger diameter external surface 135 terminating upwardly at an annular upwardly facing shoulder 136. A vertical rod 137 is threadedly connected at its lower end 237 into the upper end of shaft 130, and extends upwardly through and is guided for vertical movement by a bushing 250 connected into plate 42 in fixed position relative thereto. Rod 137 has a threaded portion 138 at its upper end on which an adjustable part 139 is threadedly connected. Part 139 has an annular flange 140 with a downwardly facing horizontal surface 141 engageable with an end portion 142 of pin 59 of the parallelogram mechanism 57 to actuate that pin downwardly upon downward movement of shaft 130.

Above shoulder 136, there is disposed about rod 137 an upwardly facing cup shaped part 143 containing a cylindrical permanent magnet 144 having an upper horizontal surface 145 forming two magnetic North and South poles engageable upwardly with the horizontal undersurface 146 of plate 42. The plate 42 is formed of a magnetic material, preferably steel, so that the magnet normally tends to be urged upwardly against surface 146 and be retained in contact therewith by magnetic attraction. Magnet 144 is a close fit within cup shaped part 143, and is secured rigidly thereto by deformation of localized portions 147 of the side wall of the cup into the groove 148 formed in the upper side of the magnet between its two pole faces. Rod 137 carried by shaft 130 extends upwardly through passages 149 formed in cup shaped part 143 and magnet 144, and is a close fit within those passages. Part 143 has a downwardly projecting tubular portion 150 with an outer helically curved groove 151 receiving and attached rigidly to the upper extremity of spring 128. Spring 128 is a tension spring, tending to pull part 143 and magnet 144 downwardly to the broken line position 143′ of FIG. 8, with the lower end of portion 150 of part 143 engaging shoulder 136 on shaft 130 to transmit downward force from parts 143 and 144 to shaft 130 and through it to diaphram 125. The tensional force of spring 128 is great enough to pull part 143 and the magnet downwardly when the pressure in chamber 118 falls to a predetermined critical value at which source 11 should be recharged to a higher pressure. So long as the pressure at source 11 and in chamber 118 exceeds that critical value, the pressure in chamber 118 acting through the diaphragm is sufficient to hold shaft 130 and the magnet upwardly against the tendency of spring 128, and to a position in which the upper surface 145 of the magnet contacts the undersurface of plate 42. In that position the magnetic attraction between elements 144 and 42 supplements the upward force of the air in chamber 118 and assures effective retention of the magnet and shaft in their upper position. As the pressure in chamber 118 falls toward the mentioned critical value, the combined upward force exerted by that pressure and the magnetic attraction between parts 144 and 42 prevents downward movement of the magnet and connected parts until that combined force is no longer sufficient to overcome spring 128, at which time the magnetic force is suddenly overcome and the magnet and connected parts move downwardly from the full line position of FIG. 8 to the broken line position 143′ of that figure, with the increasing distance between the magnet and plate 42 acting to rapidly decrease the magnetic attraction between the parts and thus assure a rapid and positive snap action of the magnet downwardly. As the magnet moves downwardly, flange 140 on part 139 at the upper end of rod 137 acts downwardly against the end 142 of pin 59, and thus depresses pin 59 to actuate the parallelogram mechanism 57 in a manner moving latch pin 68 out of notch 69 and permitting clockwise swinging movement of arm 27 to the broken line actuated position of FIG. 1. Part 139 is adjusted threadedly on the upper end of rod 137 to an axial position on the rod at which flange 140 will be located just above the level of pin 59 when the parallelogram mechanism is in its latching condition shown in full lines in FIG. 1, and with flange 140 close enough to that pin to assure downward actuation of the pin when the magnet and shaft 130 move downwardly under the influence of spring 128 in response to the predetermined reduction in pressure in chamber 118. Downward movement of the magnet and connected parts thus assures actuation of the parallelogram mechanism and swinging movement of arm 27 to its broken line position, which reverses the condition of the two valves 32 and 33 and applies pressure to unit 12 closing the controlled valve 13.

With reference now to FIGS. 6 and 7, the main shaft 36 is turned about axis 37 in a direction to cock or reset arm 27 to its full line position of FIG. 1 by an extension shaft or resetting shaft 152, which is aligned axially with and projects outwardly from shaft 36 and has an outer cylindrical surface 153 of a diameter corresponding to and aligned with the outer cylindrical surface 154 of shaft 36. The extension shaft 152 is received within a cylindrical passage 155 formed in a side wall of the lower body section 20 and extending to its exterior, to allow access from the outside of the body to an allen wrench socket recess 156 formed in the end of extension shaft 152. An allen wrench 157 is insertable into this non-circular recess 156, to turn shaft 152 and the connected shaft 36. To transmit rotary force between the two shafts, the shaft extension 152 may nave a diametrically extending projection 158 at its inner end receivable in driving relation within a diametrical groove or recess 159 formed in the end of shaft 36. In its outer surface, extension shaft 152 has an annular groove 160 containing a circular sleeve assembly 161 and an annular seal ring 162. Axially outwardly beyond groove 160, the extension shaft may contain a second shorter groove 163 within which a second seal ring 164 is received. Cylindrical surfaces 153 axially between and axially beyond the two grooves 160 and 163 are at a common diameter slightly less than the diameter of the internal cylindrical surface of passage 155 in the body. Seal rings 162 and 164 contact surface 155 and form an effective fluid seal preventing the flow of air axially between the interior and exterior of the body of the device.

Groove 160 is defined by an inner cylindrical surface 165 centered about axis 37 and two radially extending annular end surfaces 166 and 167. Bushing assembly 161 includes two similar complementary semi-circular sections 161a and 161b having end faces meeting in a diametrical plane at 168. Internally, the two sleeve sections 161a and 16b have inner cylindrical surfaces 169 which are complementary and of a diameter fitting closely about the outer cylindrical surface 165 formed on extension shaft 152 within groove 160. Externally, the two sleeve sections 161a and 161b have complementary outer cylindrical surfaces 170 centered about axis 37 and of a diameter corresponding essentially t the diameter of outer surfaces 153 on shaft 152. At a central location along the axial extent of outer surfaces 170, the two sleeve sections 161a and 161b have complementary semi-circular grooves 171 centered about axis 37. At opposite sides of the passage 155 within which shaft extension 152 is received, the lower body section 20 of the device contains two vertically extending parallel passages 172, which extend downwardly along two parallel vertical axes 173 from the upper surface of body section 20, and which are circular in horizontal cross section. A U-shaped retaining element 174 has two parallel arms 175 of similar circular cross section which are insertable downwardly into the passages 172 in body section 20, to the position illustrated in FIG. 6, to lock extension shaft 152 in its FIG. 7 position within passage 155. Arms 175 of retaining element 174 are joined at their upper ends by the curved cross piece portion 176 of element 174, and are of a diameter to fit closely within vertical passages 172. At the location at which the vertical passages 172 extend downwardly past horizontal passage 155, the vertical passages intersect and are partially truncated by passage 155, so that at the locations 177 of FIG. 6 each of the pin portions 175 is located at least partially within the annular groove 171 in a corresponding one of the sleeve sections 161a or 161b (or in portions of both of those grooves), to lock the sleeve against axial withdrawal from passage 155. As seen in FIG. 7, the grooves 171 in sleeve sections 161a and 161b are preferably of semi-circular cross section complementing portions of passages 172 in the plane of FIG. 7. By virtue of the reception of the sleeve sections within groove 160 in extension shaft 152, the retaining element 174 acts through the bushing to retain the extension shaft against withdrawal. However, the retaining element 174 does not directly contact the extension shaft 152, and thus can not tend to frictionally retain that shaft against rotation for setting or cocking the mechanism, or against returning rotation relative to arm 27 after the arm has been cocked.

Figure 8:
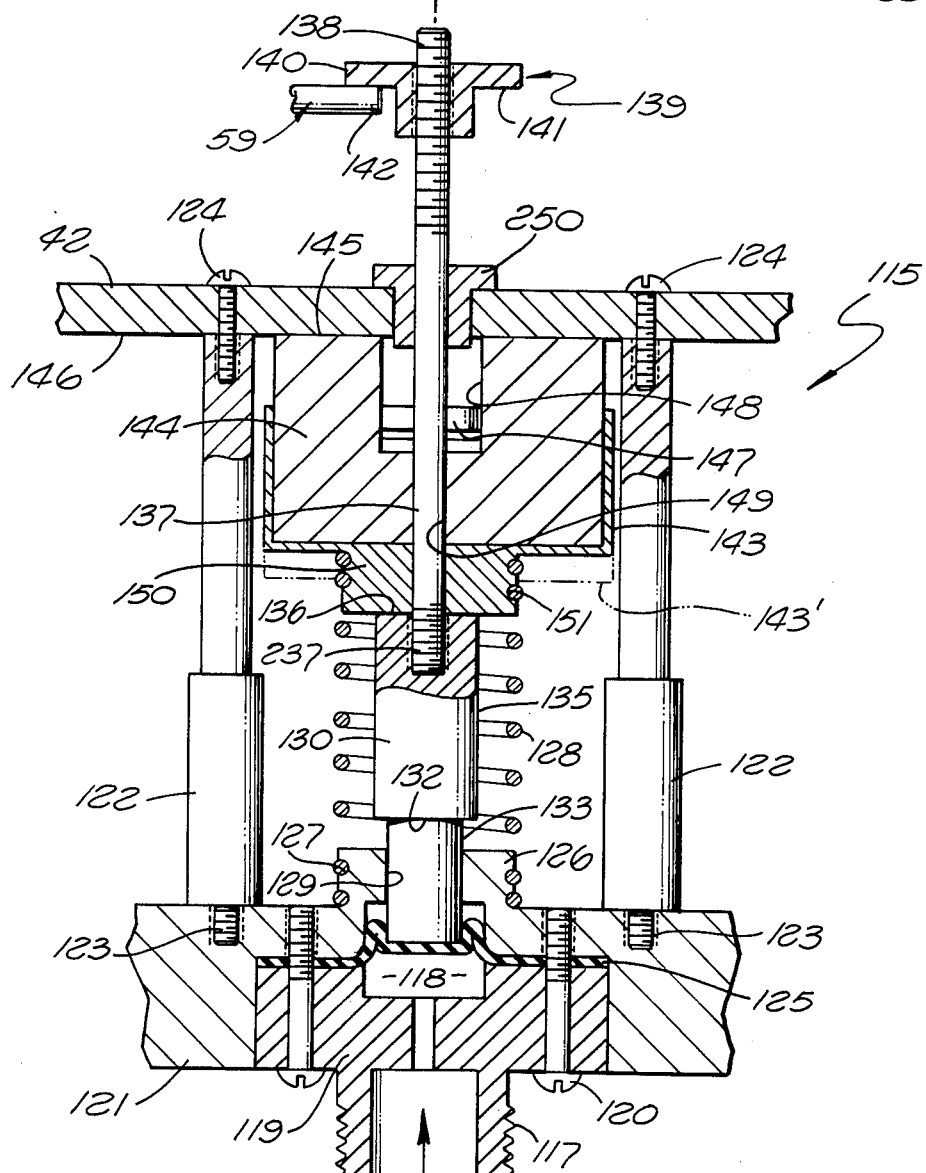
FIG. 8 is an enlarged fragmentary vertical section taken on line 8—8 of FIG. 2.

To now describe a cycle of operation of the apparatus shown in the drawings, assume that the shock responsive device 10 has been connected to the air pressure source 11 and to unit 12 in the relation illustrated in FIGS. 3, 4 and 8, and assume that valve 13 has typically been connected into a line supplying natural gas or other inflammable fluid to a building. Also assume that the pressure within source 11 is high enough to properly actuate unit 12 and the controlled valve 13. To set the shock responsive unit 10 for automatic actuation in response to earthquake or other shock forces, a user inserts allen wrench 157 into the recess 156 in the end of extension shaft 152, and utilizes the allen wrench to turn shaft extension 152 and shaft 36 in a counterclockwise direction as viewed in FIG. 1. Such rotation of the shaft acts to correspondingly turn sleeve 44 on the shaft whose lug 46 acts against the shoulder 47 on arm 27 to turn the arm from its broken line position of FIG. 1 to its full line position of that figure. In the full line position, pin 68 is deflected by arm 27 and then returns into notch 69 to hold the arm in its cocked position. Spring 49 then returns shaft 36 and extension shaft 152 in a clockwise direction as viewed in FIG. 1 to the position in which lug 6 engages the head of screw 110 as illustrated in FIG. 1 to limit such clockwise rotation of the shaft.

With the parts in this condition, if earthquake forces or other shock forces displace ball 29 laterally to a position such as that represented in FIG. 3, the ball in that condition deflects tube 56 downwardly relative to pedestal 51, actuating the parallelogram mechanism and moving latch pin 68 out of notch 69 to permit clockwise swinging movement of arm 27 to the broken line position of FIG. 1 under the influence of spring 48. Such swinging movement of the arm acts through cams 30 and 31 to close the vent to atmosphere through valve 33 from the interior of body 19, and open valve 32 allowing compressed air to enter the interior of the body of the device and flow through fitting 87 to actuator 12 for closing valve 13.

If while arm 27 is in its full line cocked position of FIG. 1, the pressure in compressed air source 11 falls to the predetermined critical value at which the source should be recharged, the drop in pressure in chamber 118 of FIG. 8 will reduce the upward force on diaphram 125 and shaft 130 to a value ultimately allowing shaft 130 and magnet 144 to move downwardly under the influence of spring 128 to the broken line position of FIG. 8, with resultant actuation of the parallelogram mechanism by flange 140 in a manner releasing latch pin 68 and permitting clockwise swinging movement of arm 27 from its full line position to its broken line position of FIG. 1. The pressure at which this occurs is still great enough to properly actuate unit 12 and valve 13 and thus close that valve. Closure of valve 13 indicates to the operator the undesirable fall in pressure, so that he can recharge compressed air source 11 to a proper pressure and then reset the mechanism.

While certain specific embodiments of the present invention have been disclosed as typical, the invention is of course not limited to this particular form, but rather is applicable broadly to all such variations as fall within the scope of the appended claims.

We claim:

1. For use a source of pressurized fluid and an actuator operable by the pressure of fluid from said source, the combination comprising:

valve means for controlling the delivery of pressurized fluid from said source to said actuator;

a shock responsive mechanism operable by shock forces to actuate said valve means to a condition operating said actuator by pressurized fluid from said source; and a device operable automatically in response to a decrease in the pressure of said fluid from said source to admit pressurized fluid to said actuator for operating it.

2. The combination as recited in claim 1, in which said device is operable automatically in response to a decrease in the pressure of said fluid from said source to actuate said valve means for admitting pressure fluid to said actuator to operate it.

3. The combination as recited in claim 1, in which said device is operable automatically in response to a decrease in the pressure of said fluid from said source to actuate said shock responsive mechanism for operating said valve means to admit pressure fluid to said actuator and operate it.

4. The combination as recited in claim 1, in which said device includes an element exposed to the pressure of fluids from said source and urged in a predetermined direction thereby, and means yieldingly urging said element in the opposite direction and acting to move said element in said opposite direction upon said decrease in the pressure of the fluid from said source.

5. The combination as recited in claim 1, in which said device includes means magnetically resisting operation of said device upon said decrease in the pressure of fluid from said source.

6. The combination as recited in claim 1, in which said device includes an element urged in a predetermined direction by the pressure of fluid from said source, spring means yieldingly urging said element in the opposite direction, and means magnetically resisting movement of said element in said opposite direction.

7. The combination as recited in claim 1, in which said device includes a diaphram exposed to the pressure of fluid from said source, an element urged in a predetermined direction by the pressure of fluid from said source applied through said diaphram, spring means yieldingly urging said element in the opposite direction and acting to move said element in said opposite direction upon said decrease in the pressure of said fluid, and a magnet resisting movement of said element in said opposite direction but adapted to be overcome by said spring means.

8. The combination as recited in claim 7, in which said element is adapted to actuate said shock responsive mechanism in a relation actuating said valve means and thereby operating said actuator upon movement of said element in said opposite direction.

9. The combination as recited in claim 8, including said source of pressurized fluid and said actuator as elements of the combination.

10. The combination as recited in claim 1, including said source of pressurized fluid and said actuator as elements of the combination.

11. For use with a source of pressurized fluid and an actuator operable to close a power operated valve by the pressure of fluid from said source, the combination comprising:

control valve means for admitting pressure fluid from said source to said actuator to close said power operated valve;

a shock responsive mechanism operable by shock forces to open said control valve means and admit pressurized fluid to said actuator for closing said power operated valve; and a device responsive to a decrease in the pressure of said fluid from said source to admit pressurized fluid to said actuator for closing said power operated valve.

12. The combination as recited in claim 11, in which said device is responsive to said decrease in the pressure of fluid from said source to actuate said control valve means for admission of pressurized fluid to said actuator to close the power operated valve.

13. The combination as recited in claim 11, in which said device is responsive to said decrease in pressure of said fluid from said source to actuate said shock responsive mechanism for opening said control valve means to operate said actuator for closing the power operated valve.

14. The combination as recited in claim 11, in which said device includes an element urged in a predetermined direction by the pressure of fluid from said source, and means yieldingly urging said element in the opposite direction and acting to move said element in said opposite direction upon said decrease in the pressure of fluid from said source.

15. The combination as recited in claim 11, in which said device includes means magnetically resisting actuation of the device in response to said decrease in pressure of said fluid.

16. The combination as recited in claim 11, in which said device includes an element urged in a predetermined direction by the pressure of fluid from said source, spring means yieldingly urging said element in the opposite direction, and a magnet structure resisting movement of said element in said opposite direction by said spring means but adapted to be overcome by the spring means upon said decrease in the pressure of said fluid; said element being operable upon movement in said opposite direction to actuate said shock responsive mechanism for opening said control valve means and admitting pressure fluid to said actuator for closing the power operated valve.

17. The combination as recited in claim 11, in which said device includes an element urged in a predetermined direction by the pressure of fluid from said source, spring means yielding urging said element in the opposite direction, and means operable upon movement of said element in said opposite direction to actuate said shock responsive mechanism for opening said control valve means and admitting pressure fluid to said actuator for closing said power operated valve.

18. The combination as recited in claim 11, in which said device includes a diaphragm exposed to the pressure of fluid from said source, a plunger adapted to be actuated in a predetermined direction by the pressure of fluid from said source applied through said diaphragm to said element, spring means yieldingly resisting movement of said plunger in said predetermined direction and adapted to return the plunger in the opposite direction upon said decrease in the pressure of said fluid, and a structure carried by said plunger and adapted upon movement of the plunger in said opposite direction to actuate said shock responsive mechanism to open said control valve means and admit pressure fluid to said actuator for closing said power operated valve.

19. The combination as recited in claim 18, including means for adjusting said structure relative to said plunger to vary the position in which said plunger actuates said shock responsive mechanism.

20. The combination as recited in claim 19, including a magnet resisting movement of said plunger in said opposite direction by said spring means.

21. The combination as recited in claim 20, including said source of pressurized fluid and said actuator as elements of the claim.

22. The combination as recited in claim 11, including said source of pressurized fluid and said actuator as elements of the claim.

23. An actuator comprising:
shock responsive mechanism automatically operable by shock forces to actuate a controlled unit;
an assembly for setting said mechanism;
a structure containing a first passage extending along an axis for receiving said assembly;
said assembly including a shaft which is movable along said axis into and out of said first passage and is operable by rotation about said axis in a predetermined active position within the passage to set said mechanism, and a sleeve disposed about said shaft for movement into and out of said passage with the shaft and relative to which said shaft is rotatable about said axis to set said mechanism;
said sleeve and shaft interfitting in a relation preventing removal of said shaft from said first passage without said sleeve; and
a retaining element insertable into an additional passage or passages in said structure to a position in the path of axial removal of said sleeve from said first passage and acting to thereby retain both the sleeve and shaft against removal.

24. An actuator as recited in claim 23, in which said shaft has an external groove, and said sleeve is received within said groove in said interfitting relation preventing removal of the shaft from said first passage without said sleeve.

25. An actuator as recited in claim 23, in which said sleeve has an external groove receiving at least a portion of said retaining element to block removal of the sleeve and shaft from said first passage.

26. An actuator as recited in claim 23, in which said sleeve is formed of a plurality of sections at different locations about the shaft.

27. An actuator as recited in claim 23, in which said assembly includes a second shaft aligned with and axially inwardly of said first mentioned shaft and engageable with said first shaft when the latter is in said first passage in a relation transmitting rotation from the first shaft to the second shaft for setting said mechanism.

28. An actuator as recited in claim 23, in which said retaining element is a generally U-shaped part having two arms slidably insertable into two of said additional passages at opposite sides of said sleeve and receivable partially within an external groove in the sleeve to block axial removal of the sleeve and shaft from said first passage.

29. An actuator as recited in claim 28, in which said sleeve comprises two substantially semi-circular complementary sleeve sections received and confined within an external groove in said shaft.

30. An actuator comprising:
an arm mounted for swinging movement about an axis between first and second positions;
means yieldingly urging said arm about said axis and toward said second position thereof;
a latch element engageable with said arm in a relation releasably retaining said arm in said first position;
shock responsive means operable in response to shock forces to actuate said latch element in a direction automatically releasing said arm for movement by said yielding means to said second position;
first and second valves for controlling the delivery of pressure fluid to and from a fluid actuated controlled unit; and
two cams connected to said arm for rotary movement therewith about said axis and acting upon swinging movement of the arm from said first position to said second position to progressively open said first valve and progressively close said second valve.

31. An actuator as recited in claim 30, in which said second valve acts in said first position of said arm to vent pressure from said controlled unit, and said first valve acts in said second position of said arm to admit pressure fluid to said controlled unit for operation thereof.

32. An actuator as recited in claim 30, in which said first and second valves have spring pressed valve elements extending and movable essentially parallel to one another, there being a force transmission element having two arms each of which is received between a corresponding one of said cams and a corresponding one of said valve elements to transmit actuating force therebetween.

33. An acutator as recited in claim 30, including a leaf spring having two arms each received between one of said cams and a corresponding one of said valves, and having a third and shorter arm between said two arms, there being a fastener securing said third arm in fixed position.

34. An actuator as recited in claim 30, in which said first and second valves have spring pressed valve elements extending and movable essentially parallel to one another, there being a force transmission element for transmitting force from said cams to said valve elements, a fastener securing said force transmission element in fixed position, and having a head, a shaft operable by rotary movement in a predetermined direction to swing said arm to said first position, and a lug carried by said shaft and engageable with said head of the fastener to limit rotary movement of said shaft in a direction the opposite of said predetermined direction.

* * * * *